(12) United States Patent
Chao et al.

(10) Patent No.: US 10,747,328 B2
(45) Date of Patent: Aug. 18, 2020

(54) MOTION RECOGNITION APPARATUS AND CONTROL METHOD THEREOF

(71) Applicant: PVD PLUS CO., LTD., Taichung (TW)

(72) Inventors: Chih-Fan Chao, Taoyuan (TW); Yu-Chun Hsu, Taipei (TW); Zheng-Chang Huang, New Taipei (TW)

(73) Assignee: PVD PLUS CO., LTD., Taichung (TW)

( * ) Notice: Subject to any disclaimer, the term of this patent is extended or adjusted under 35 U.S.C. 154(b) by 281 days.

(21) Appl. No.: 15/448,664

(22) Filed: Mar. 3, 2017

(65) Prior Publication Data

US 2017/0255270 A1 Sep. 7, 2017

(30) Foreign Application Priority Data

Mar. 4, 2016 (TW) ............................. 105106692 A

(51) Int. Cl.
*G06F 3/01* (2006.01)
*G06N 20/00* (2019.01)
(Continued)

(52) U.S. Cl.
CPC ........... *G06F 3/017* (2013.01); *G05B 19/042* (2013.01); *G06F 1/163* (2013.01); *G06F 1/1694* (2013.01);
(Continued)

(58) Field of Classification Search
CPC .......... G06F 3/017; G06F 1/163; G06F 3/014; G06F 1/1698; G06F 1/1694; G06F 3/038;
(Continued)

(56) References Cited

U.S. PATENT DOCUMENTS

| 5,325,434 | A | * | 6/1994 | Spaanderman | ....... H04L 63/104 380/262 |
| 2005/0172119 | A1 | * | 8/2005 | Eckhardt | ................... H04K 1/02 713/160 |

(Continued)

FOREIGN PATENT DOCUMENTS

| TW | 201204061 A1 | 1/2012 |
| TW | 201240495 A1 | 10/2012 |

(Continued)

*Primary Examiner* — Patrick N Edouard
*Assistant Examiner* — Joseph P Fox
(74) *Attorney, Agent, or Firm* — Li & Cai Intellectual Property (USA) Office

(57) ABSTRACT

A motion recognition apparatus and a control method thereof, capable of controlling and operating a controlled device by determining a gesture variation of a user to replace conventional finger touch for a user interface. The motion recognition apparatus includes a first device, a second device and a controlled device wirelessly connected to the first device and the second device. The first device detects a gesture variation of a user. The second device calculates the number of gesture variations and outputs a corresponding control signal. The second device includes a motion recognition unit and a fast communication unit, enabling the controlled device to receive the control signal and operate according to the gesture variation of the user. Accordingly, the user interface becomes more user-friendly and makes the controlled device more controllable and the Internet of Things (IoT) more applicable.

13 Claims, 9 Drawing Sheets

(51) Int. Cl.
  *H04M 1/725* (2006.01)
  *G06F 1/16* (2006.01)
  *G05B 19/042* (2006.01)
  *G06F 3/0346* (2013.01)
  *G06F 3/038* (2013.01)
  *H04W 4/80* (2018.01)
  *H04W 84/12* (2009.01)

(52) U.S. Cl.
  CPC ............ *G06F 1/1698* (2013.01); *G06F 3/014* (2013.01); *G06F 3/038* (2013.01); *G06F 3/0346* (2013.01); *G06N 20/00* (2019.01); *H04M 1/72533* (2013.01); *G05B 2219/2642* (2013.01); *G05B 2219/35444* (2013.01); *H04M 2250/02* (2013.01); *H04M 2250/06* (2013.01); *H04M 2250/52* (2013.01); *H04W 4/80* (2018.02); *H04W 84/12* (2013.01)

(58) Field of Classification Search
  CPC ................ G06F 3/0346; G05B 19/042; G05B 2219/35444; G05B 2219/2642; G06N 99/005; G06N 20/00; H04W 84/12; H04W 4/80; H04M 2250/06; H04M 1/72533; H04M 2250/52; H04M 2250/02
  See application file for complete search history.

(56) References Cited

U.S. PATENT DOCUMENTS

| | | | |
|---|---|---|---|
| 2006/0209773 A1* | 9/2006 | Hundal | H04L 63/0428 370/338 |
| 2009/0164219 A1* | 6/2009 | Yeung | G04C 3/002 704/258 |
| 2011/0190052 A1 | 8/2011 | Takeda et al. | |
| 2013/0165088 A1* | 6/2013 | Agsteiner | G06F 3/017 455/416 |
| 2013/0181810 A1* | 7/2013 | Plotsker | G06F 1/163 340/5.52 |
| 2014/0198025 A1* | 7/2014 | Veygman | G06F 3/017 345/156 |
| 2016/0320849 A1* | 11/2016 | Koo | G06F 3/017 |

FOREIGN PATENT DOCUMENTS

| | | | |
|---|---|---|---|
| TW | 201514761 A | 4/2015 | |
| WO | WO-2013065038 A1 * | 5/2013 | ............ H04W 8/005 |

* cited by examiner

MOTION RECOGNITION APPARATUS AND CONTROL METHOD THEREOF

BACKGROUND

1. Technical Field

The present invention generally relates to a motion recognition apparatus and a control method thereof and, more particularly, to a motion recognition apparatus capable of controlling and operating a controlled device by determining a gesture variation of a user and a method thereof.

2. Description of Related Art

Among the modern technologies, controlling the operation of a computer by gesture recognition is generally realized by image recognition to determine the gesture of a user to provide the displacement of a target (for example, the hand of the user) by calculating the change in coordinate from the initial coordinate to the final coordinate, and further determine the relative position corresponding to an application in the computer such that the user can select on the menu to play, for example, "whack-a-mole" by gesture.

Another gesture recognition control technology is realized by finger touch, which includes single-finger touch for handsets or tablet computers and multi-finger touch for laptop computers.

However, the above referenced technologies are only operations applicable to computer software and fail to be used for connecting and controlling distant controlled devices. Therefore, there is a need to provide a motion recognition apparatus and a control method thereof capable of overcoming the above problems.

SUMMARY

The present invention generally relates to a motion recognition apparatus and a control method thereof, capable of controlling and operating a controlled device by determining a gesture variation of a user to replace conventional finger touch for a user interface. Accordingly, the user interface becomes more user-friendly and makes the controlled device more controllable and the Internet of Things (IoT) more applicable.

The motion recognition apparatus of the present invention includes a first device, a second device and a controlled device. The first device includes a multi-source data analysis and motion recognition sensor configured to sense a gesture variation of a user, a Bluetooth communication module coupled to the multi-source data analysis and motion recognition sensor for wireless communication, and a Wi-Fi communication module coupled to the multi-source data analysis and motion recognition sensor for wireless communication.

The second device includes a Bluetooth/Wi-Fi communication input interface, as a signal input interface of the second device, configured to receive a wireless communication signal, a sensor configured to sense the first device, a central processing unit coupled to the Bluetooth/Wi-Fi communication input interface and the sensor and configured to operate and process in the second device, a memory coupled to the central processing unit and configured to store a plurality of values, a motion recognition unit coupled to the central processing unit and configured to conduct value recognition on the gesture variation of the user sensed by the first device and provide a simple recognized value, a fast communication unit coupled to the central processing unit and the motion recognition unit and configured to establish wireless communication among various devices, and a Bluetooth/Wi-Fi communication output interface coupled to the fast communication unit and configured to wirelessly transmit a control signal corresponding to the simple recognized value.

The controlled device includes a Bluetooth/Wi-Fi communication module configured to receive the control signal corresponding to the simple recognized value to conduct corresponding remote control and operations.

The central processing unit provides the control signal corresponding to the simple recognized value after the motion recognition unit provides the simple recognized value.

The motion recognition method of the present invention uses a first device to sense a gesture variation of a user, a second device to conduct value recognition on the gesture variation and wirelessly transmit a control signal correspondingly, and a controlled device to receive the control signal to conduct operations according to the gesture variation of the user. The motion recognition method comprises the following steps. A value is selected from a plurality of values acquired by a multi-source data analysis and motion recognition sensor of the first device. The value is encrypted. A series of permuted values are provided. A simplified value is provided corresponding to the permuted values. The simplified value is identified to indicate that the gesture variation is simple or complex. An initial motion recognition step is completed.

The motion recognition method of the present invention further includes a fast communication step to wireless communicate the second device and the controlled device. The fast communication step includes the following steps. The controlled device provides and encrypts a first sequence of values. The second device provides and encrypts a second sequence of values. A cloud reads and encrypts a third sequence of values. Communication is started if the first sequence of values, the second sequence of values and the third sequence of values are identical.

In order to further understand the techniques, means and effects of the present invention, the following detailed descriptions and appended drawings are hereby referred to, such that, and through which, the purposes, features and aspects of the present invention can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

The detailed description set forth below in connection with the appended drawings is intended as a description of certain embodiments of the present invention, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present invention.

The present invention generally relates to a motion recognition apparatus and a control method thereof, using the recognition of a gesture variation of a user. In a first embodiment, a device capable of sensing is installed on a user so as to recognize and identify the gesture variation of the user and transmit a signal to a device capable of operating and transmitting such that the device capable of operating and transmitting further controls a distant controlled device. Therefore, the user can control the controlled device to operate by changing gesture. In another embodiment, a device capable of sensing motions installed on the user can be used to control a distant controlled device to operate.

Figure 1:
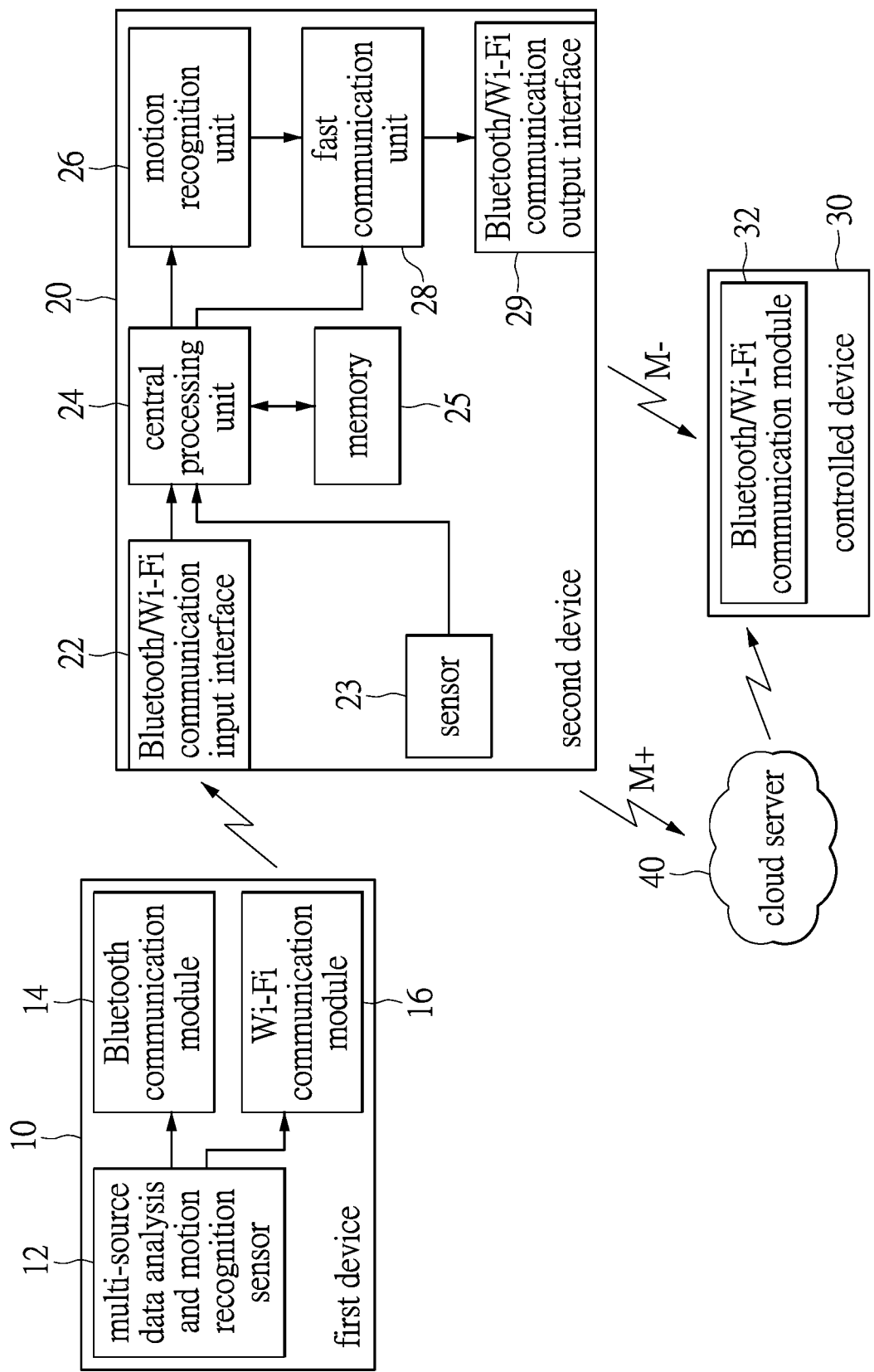
FIG. 1 is a schematic diagram of a motion recognition apparatus according to a first embodiment of the present invention.

The motion recognition apparatus according to a first embodiment of the present invention in FIG. 1 includes a first device 10, a second device 20, and a controlled device 30. The motion recognition apparatus may further include a cloud server 40. The first device 10 includes a multi-source data analysis and motion recognition sensor 12, a Bluetooth communication module 14 and a Wi-Fi communication module 16. The second device 20 includes a Bluetooth/Wi-Fi communication input interface 22, a sensor 23, a central processing unit 24, a memory 25, a motion recognition unit 26, a fast communication unit 28 and a Bluetooth/Wi-Fi communication output interface 29. The controlled device 30 includes a Bluetooth/Wi-Fi communication module 32. The cloud server 40 communicates wirelessly with the second device 20 and the controlled device 30.

The multi-source data analysis and motion recognition sensor 12 of the first device 10 is practically implemented by a G-sensor, or includes, but is not limited to, a gravity sensor, a gyroscope, a magnetometer, a mechanomyography (MMG), or other related sensors capable of analyzing and recognizing the signals representing the motions of a human body, especially the gesture or hand motions of the user. The multi-source data analysis and motion recognition sensor 12 is coupled to the Bluetooth communication module 14 and the Wi-Fi communication module 16, and is configured to sense a gesture variation of a user so as to transmit a signal representing the gesture variation to the first device 10 or the second device 20 by Bluetooth and Wi-Fi wirelessly communication.

Practically, the first device 10 is implemented by, but is not limited to, a bracelet, a ring, a watch, a watchband, a wristband or a glove, in which the multi-source data analysis and motion recognition sensor 12, the Bluetooth communication module 14 and the Wi-Fi communication module 16 are disposed and interconnected. Accordingly, the bracelet, the ring, the watch, the watchband, the wristband or the glove can recognize the gesture variation or the change of hand motions of the user.

The Bluetooth/Wi-Fi communication input interface 22 of the second device 20 is coupled to the central processing unit 24 and is configured to receive a signal representing the gesture of the user transmitted by the first device 10 and transmit the signal to the central processing unit 24 to be recognized and processed. The central processing unit 24 is coupled to the sensor 23. The sensor 23 is configured to sense the first device 10 and connect the first device 10 and the second device 20. The central processing unit 24 is coupled to the memory 25, which stores the data generated after the gesture variation of the user is recognized such that the central processing unit 24 is able to control the controlled device when the gesture of the user is recognized as the same gesture. In other words, the central processing unit 24 of the second device 20 is designed to have self-learning and is able to store the operation defined according to the recognized gesture so as to control the controlled device in the future.

The output of the central processing unit 24 is coupled to the motion recognition unit 26 and the fast communication unit 28, respectively. The output of the motion recognition unit 26 is coupled to the fast communication unit 28. The motion recognition unit 26 is configured to determine the gesture variation and define the operations according to various gesture variations. Detailed description of the operation of the motion recognition unit 26 will be given with reference to FIG. 3A. The fast communication unit 28 is not only coupled to the central processing unit 24, but also coupled to the motion recognition unit 26, such that the second device 20 can communicate with the first device 10 fast and also communicate with the controlled device 30 or the cloud server 40 fast.

In the second device 20, after the gesture variation of the user is recognized and identified by the motion recognition unit 26, the fast communication unit 28 establishes an interconnection among the first device 10, the second device 20 and the controlled device 30, such that the first device 10 remotely controls the controlled device 30 through the definition and setting by the second device 20. When the first device 10 installed on the user senses the gesture variation, a signal representing the gesture variation is transmitted to the second device 20. After the second device 20 processes the signal, the second device 20 provides a control signal correspondingly and transmits the control signal to the controlled device 30. The Bluetooth/Wi-Fi communication module 32 of the controlled device 30 is capable of conducting wireless communication with the second device 20 such that the second device 20 transmits the control signal to the controlled device 30 to control the controlled device 30 after the second device 20 processes the control signal.

Practically, the second device 20 is implemented by, but is not limited to, a smart handset, a tablet computer, a smart watch or other smart handheld device (for example, a smart handheld device for industry use, medical use, or enterprise use). The controlled device 30 is implemented by, but is not limited to, a remote unmanned aerial vehicle (UAV), a remote-controlled car, a remote-controlled aircraft, a remote-controlled ship, a general appliance, a smart lighting device or a smart home system. Similarly to the controlled device 30, the remote unmanned aerial vehicle (UAV), the remote-controlled car, the remote-controlled aircraft, the remote-controlled ship, the general appliance, the smart lighting device or the smart home system has to be equipped with a Bluetooth/Wi-Fi communication module 32, as shown in FIG. 1, to transmit the control signal.

The cloud server 40 is wirelessly connected to the second device 20 and the controlled device 30 and is configured for self-learning (M+ and M−). The cloud server 40 can store a large amount of data of gesture variations, used or learned, of different users. The cloud server 40 provides a databank containing a large amount of data of gesture variations. Therefore, the databank stores the data of gesture variations of different users for different purposes. When a complex gesture variation is repeated by the same user, the cloud server 40, being connected to the network, can recognize the gesture according to the databank.

Figure 2:
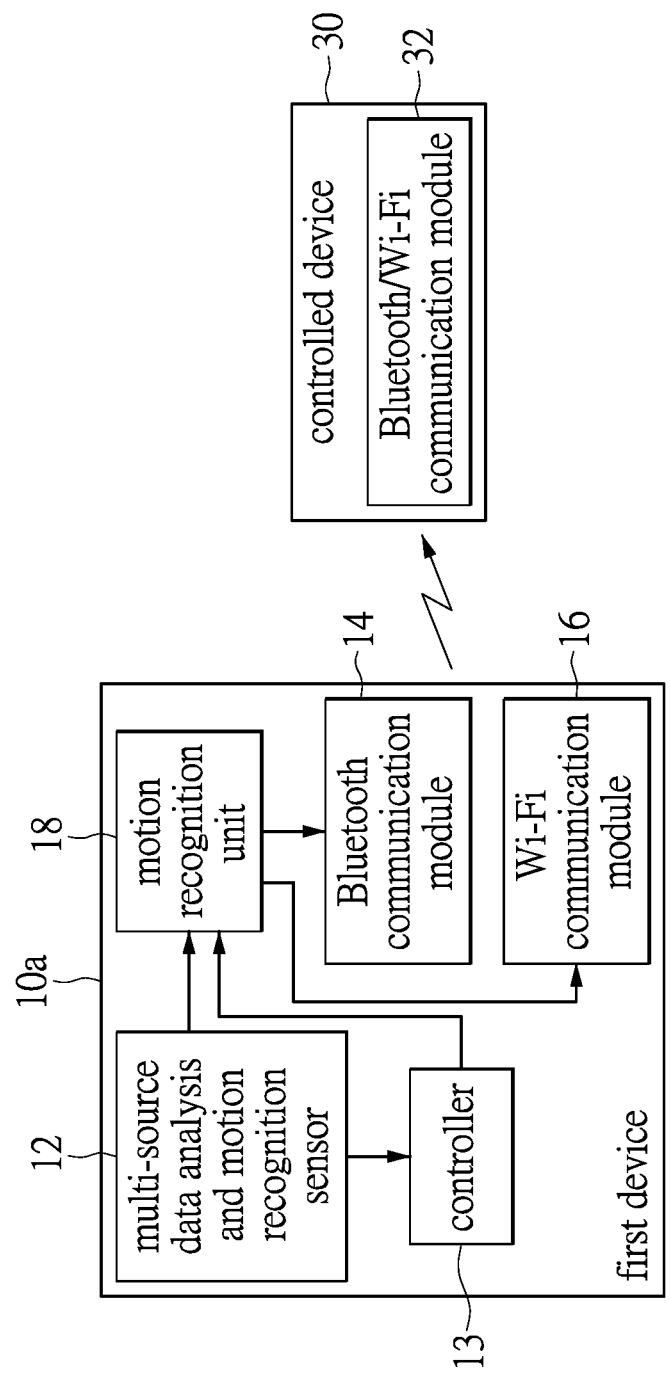
FIG. 2 is a schematic diagram of a motion recognition apparatus according to a second embodiment of the present invention.

The motion recognition apparatus according to a second embodiment of the present invention in FIG. 2 includes a first device 10a capable of remotely controlling a controlled device 30. Compared to the first device 10 in the first embodiment, the first device 10a further includes a controller 13 and a motion recognition unit 18. The output of the multi-source data analysis and motion recognition sensor 12 is coupled to the controller 13 and the motion recognition unit 18, respectively. After the multi-source data analysis and motion recognition sensor 12 senses the gesture variation of the user, the multi-source data analysis and motion recognition sensor 12 transmits a signal to the motion recognition unit 18 to conduct recognition. The signal is then transmitted to the controller 13 such that the controller 13 controls the motion recognition unit 18 and provides a control signal correspondingly. The first device 10a is then wirelessly connected to the Bluetooth/Wi-Fi communication module 32 of the controlled device 30 through the Bluetooth communication module 14 or the Wi-Fi communication module to further control the controlled device 30 to operate correspondingly according to the gesture variation sensed by the first device 10. Practically, the motion recognition unit 18 is similar to the motion recognition unit 26 of the second device 20 in the first embodiment.

Figure 3A:
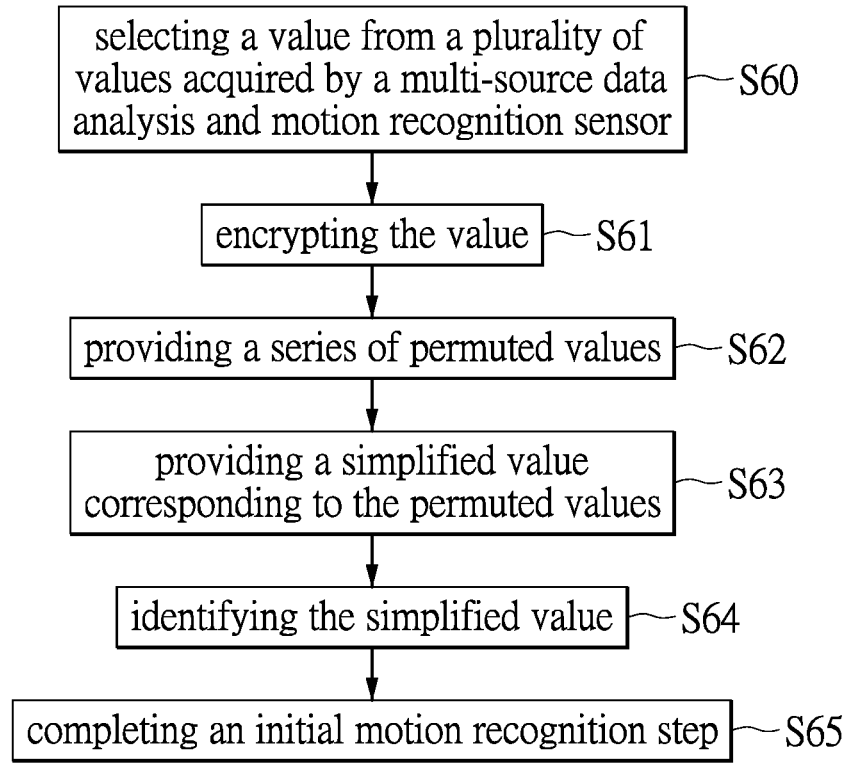
FIG. 3A is a flowchart of a motion recognition method according to one embodiment of the present invention.

FIG. 3A is a flowchart of a motion recognition method according to one embodiment of the present invention. The control method of the motion recognition unit 26 according to the present invention is described herein. As previously disclosed, the motion recognition unit 26 is configured to determine the gesture variation and provide a value corresponding to the gesture variation. Moreover, the motion recognition unit 26 can define the operations according to various gesture variations. The control method for motion recognition includes the following steps. In Step S60, a value is selected from a plurality of values acquired by a multi-source data analysis and motion recognition sensor. In Step S61, the value is encrypted. In Step S62, a series of permuted values are provided. In Step S63, a simplified value is provided corresponding to the permuted values. In Step S64, the simplified value is identified. An initial motion recognition step is completed in Step S65. After that, the central processing unit 24 provides a control signal corresponding to initial motion recognition. The control signal is further transmitted to the controlled device 30 through wireless communication between the fast communication unit 28 and the controlled device 30 to control the controlled device 30.

In Step S61, the value is encrypted by, but not limited to, Rivest-Shamir-Adleman (RSA) encryption, Laplace encryption, data encryption standard (DES) algorithm, advanced encryption standard (AES) algorithm or symmetric encryption. In Step S63, the simplified value can be a sensed value corresponding to a gesture variation pre-determined by a manufacturer or a sensed value corresponding to a personal gesture variation pre-determined by the user.

Moreover, in Step S64, the simplified value is identified to indicate whether the gesture variation is simple or complex. If the simplified value is identified to indicate that the gesture variation is complex, the cloud server 40 provides back-end learning such that the complex gesture variation can be learned and stored. The cloud server 40 provides back-end learning when the first device 10 or the second device 20 is wirelessly connected to the cloud server 40. The controlled device 30 may also be wirelessly connected to the cloud server 40.

Figure 3B:
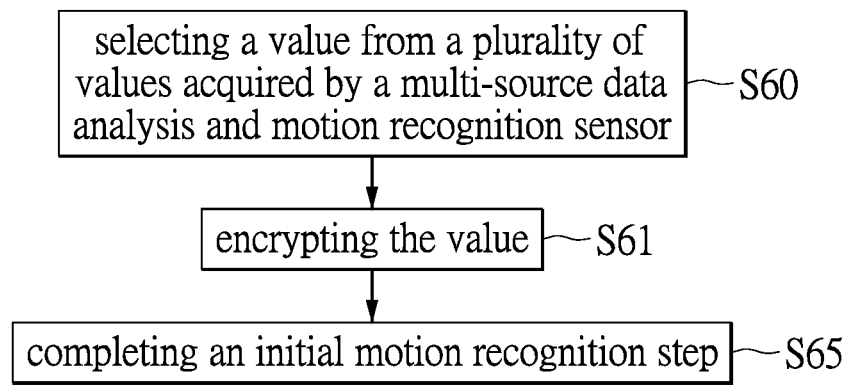
FIG. 3B is a flowchart of a motion recognition method according to another embodiment of the present invention.

In addition to FIG. 3A, FIG. 3B is a flowchart of a motion recognition method according to another embodiment of the present invention. FIG. 3B is different from FIG. 3A in that Step S65 is conducted to complete the initial motion recognition step right after conducting Step S61 to encrypt the value because it is a very crucial step for an electronic device with motion recognition to perform a first-layer numeric process on an initial value generated by the electronic device. Accordingly, in the embodiment of FIG. 3B, an initial motion recognition step is completed (in Step S65) after the value is encrypted in Step S61.

Figure 4:
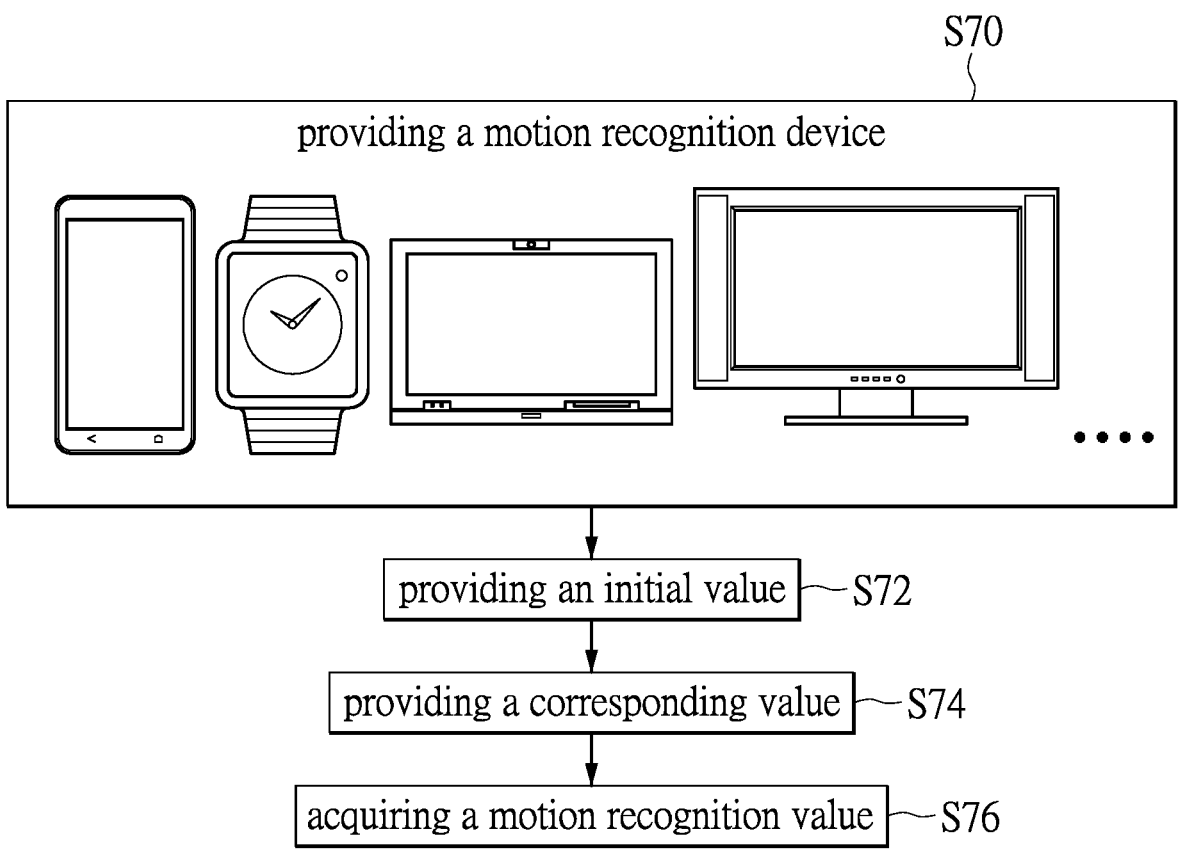
FIG. 4 is a flowchart showing the motion recognition method in FIG. 3A used in a practical device.

FIG. 4 is a flowchart showing the motion recognition method in FIG. 3A used in a practical device. The motion recognition apparatus in Step S70 is implemented by, but is not limited to, a smart handset, a smart watch, a laptop computer or a smart TV. In Step S72, the motion recognition apparatus provides an initial value. In Step S74, the motion recognition apparatus provides a corresponding value. In Step S76, a motion recognition value is acquired.

Figure 5A:
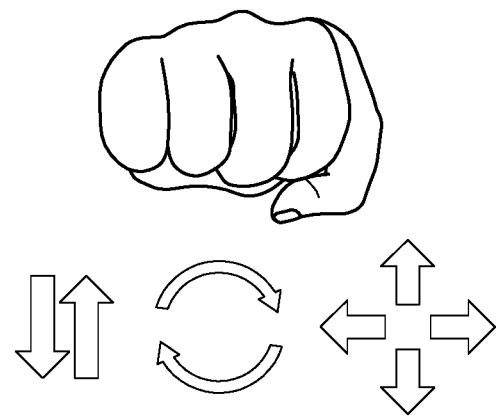
FIG. 5A is a schematic diagram showing the recognition of a basic gesture variation according to one embodiment of the present invention.
Figure 5B:
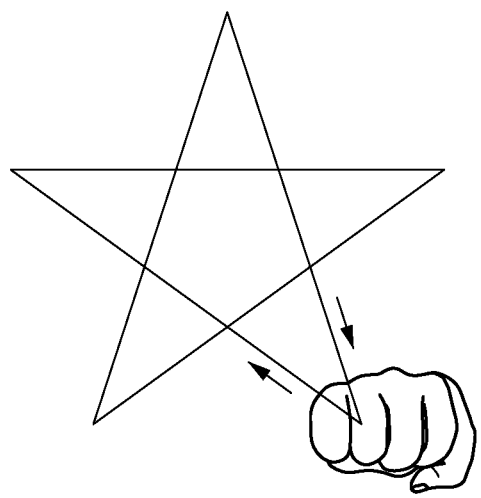
FIG. 5B is a schematic diagram showing the recognition of a general gesture variation according to one embodiment of the present invention.
Figure 5C:
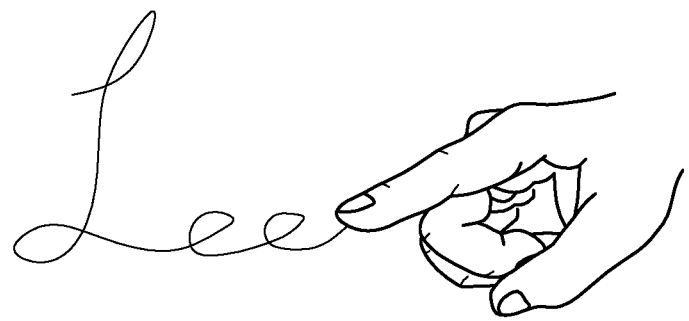
FIG. 5C is a schematic diagram showing the recognition of a complex gesture variation according to one embodiment of the present invention.
Figure 8:
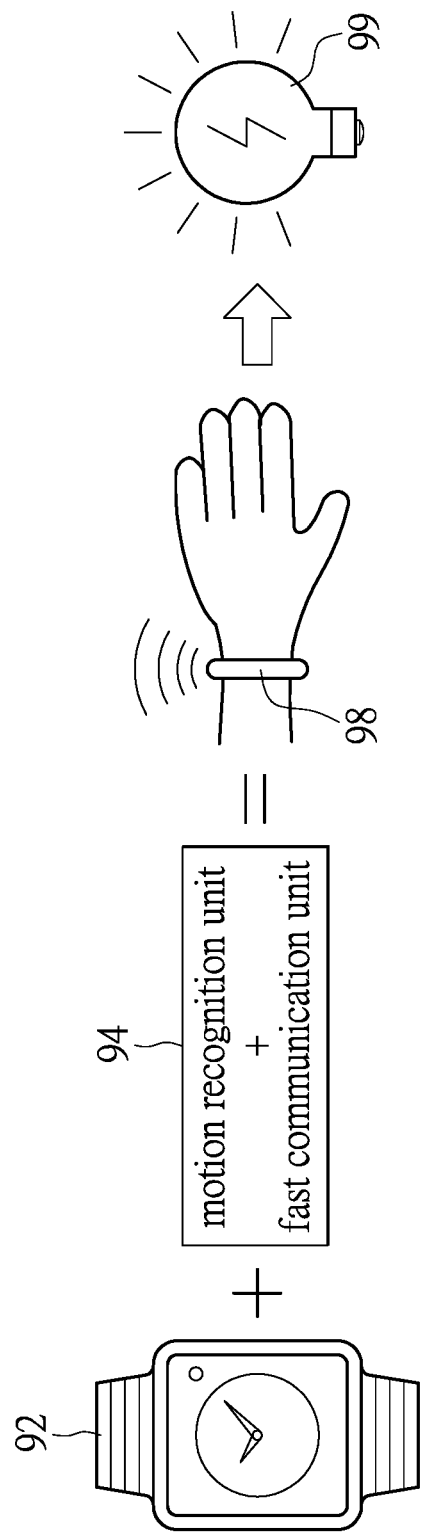
FIG. 8 is a simple schematic diagram showing an application of the present invention.

FIGS. 5A-5C are schematic diagrams showing the recognition of various gesture variations according to one embodiment of the present invention. In FIG. 5A, 8 different types of gesture variations are performed by a fist, to which the present invention is not limited. For example, the 8 different types of gesture variations can also be performed by one or more finger(s), toe(s), the head or the like that can perform gesture variations such as waving or rotating upwards, downwards, leftwards, rightwards, forwards, backwards, clockwise or counter-clockwise. In FIG. 5B, a gesture variation is performed by a fist to draw a simple pattern, for example, a star-shaped gesture variation. The value corresponding to the star-shaped gesture variation is identified to indicate that the gesture variation is complex. The gesture variation can be learned and stored in a device such as a handset, a tablet computer, a smart watch or a cloud server 40 for future applications. In FIG. 5C, a more complex gesture variation is performed by a finger to draw a word. Similarly, the gesture variation can be learned and stored in a device such as a handset, a tablet computer, a smart watch or a cloud server 40 for future applications.

Figure 6:
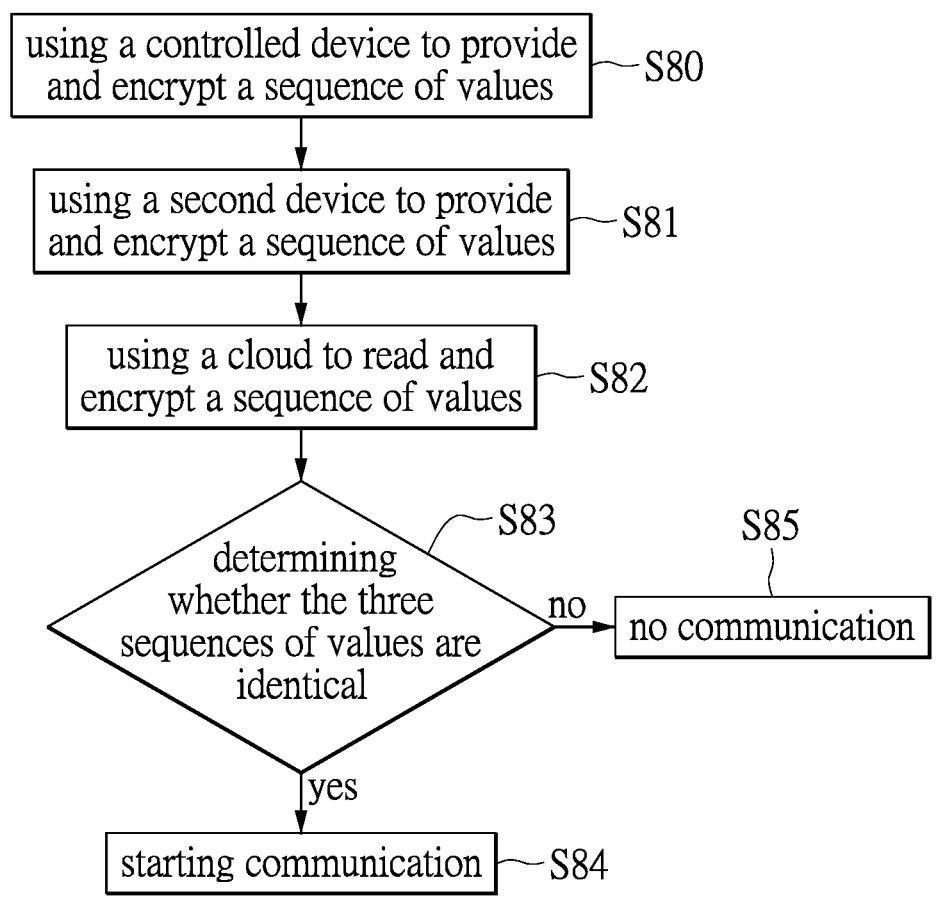
FIG. 6 is a flowchart of a fast communication step according to one embodiment of the present invention.

FIG. 6 is a flowchart of a fast communication step according to one embodiment of the present invention. The fast communication step includes the following steps. In Step S80, a controlled device provides and encrypts a sequence of values. In Step S81, a second device provides and encrypts a sequence of values. In Step S82, a cloud reads and encrypts a sequence of values. In Step S83, whether the three sequences of values are identical is determined. In Step S84, communication is started if the three sequences of values are identical. Otherwise, no communication is established in Step S85.

In Steps S80-S82, the values are encrypted by, but not limited to, Rivest-Shamir-Adleman (RSA) encryption, Laplace encryption, data encryption standard (DES) algorithm, advanced encryption standard (AES) algorithm or symmetric encryption. In Step S84, communication is established among the second device 20, the controlled device 30 and the cloud server 40.

Accordingly, the fast communication step in FIG. 6 enables fast communication between the controlled device 30 and the second device 20 so as to control the controlled device 30. The fast communication step is usually performed when wireless communication is established between various devices for the first time. As long as wireless communication has ever been established between various devices, wireless communication may be automatically established once the power is turned on. The fast communication step may also be performed with the second embodiment in FIG. 2. When only the first device 10 and the controlled device 30 are wirelessly connected, the fast communication step enables wireless communication between the first device 10 and the controlled device 30 such that the first device 10 remotely controls the controlled device 30.

Figure 7A:
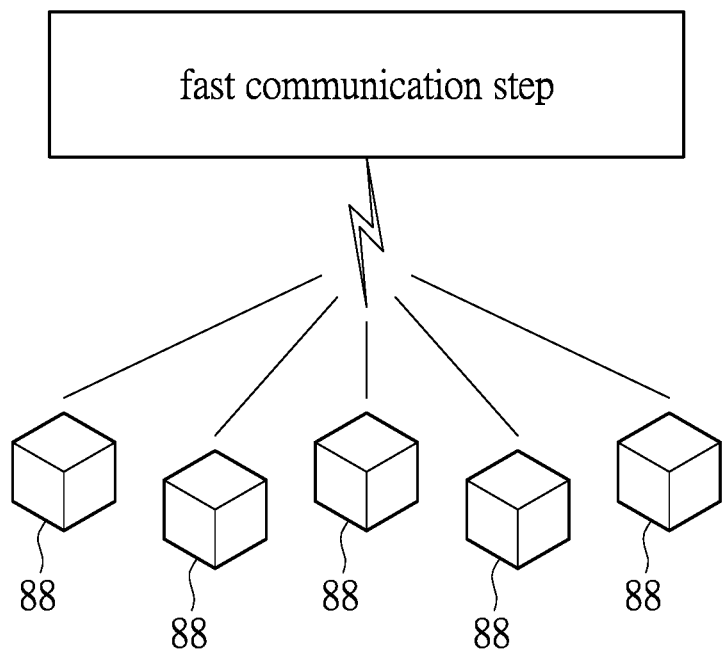
FIG. 7A is a schematic diagram showing an application of the fast communication step according to the present invention.
Figure 7B:
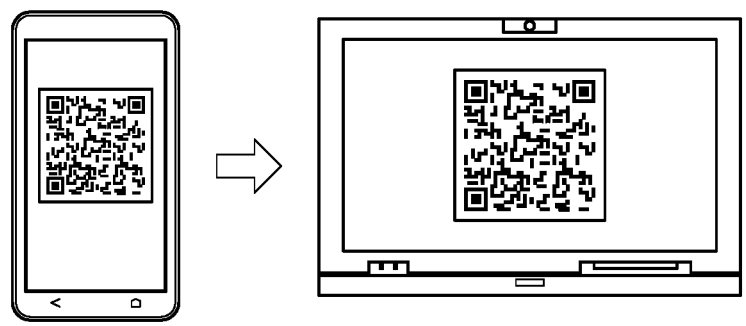
FIG. 7B is a schematic diagram showing an application of the fast communication step according to a first embodiment of the present invention.
Figure 7C:
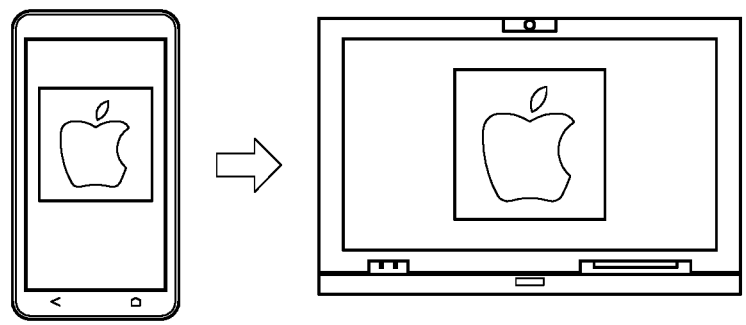
FIG. 7C is a schematic diagram showing an application of the fast communication step according to a second embodiment of the present invention.
Figure 7D:
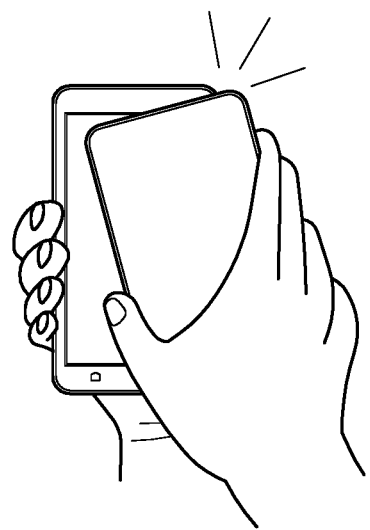
FIG. 7D is a schematic diagram showing an application of the fast communication step according to a third embodiment of the present invention.

FIGS. 7A-7D are schematic diagrams showing practical applications of the fast communication step. In FIG. 7A, the fast communication step enables wireless communication among a plurality of application devices 88. The plurality of application devices 88 are implemented by, but are not limited to, the same, different or mixed application devices 88. For example, a plurality of smart handsets, a plurality of tablet computers and a plurality of laptop computers are interconnected. In FIG. 7B, a QR Code is used to interconnect a smart handset and a laptop computer. In FIG. 7C, pattern recognition is used to interconnect a smart handset and a laptop computer. In FIG. 7D, a smart handset and a laptop computer are interconnected by near-field communication (NFC). Accordingly, the fast communication step enables wireless communication among various devices.

FIG. 8 is a simple schematic diagram showing an application of the present invention. In FIG. 8, a smart watch 92 is combined with the motion recognition unit and the fast communication unit 94 in the present invention. The data in the smart watch 92 is processed and recognized by the motion recognition unit and the fast communication unit 94 to enable the user to control an IoT device 99 by wearing a smart bracelet 98. Practically, when the user wears the smart bracelet 98, the user can control and operate the IoT device 99, for example, a remote unmanned aerial vehicle (UAV), a home-use appliance, or home-use lighting device by determining the gesture variation to replace conventional finger touch for a user interface.

As previously stated, the present invention provides a motion recognition apparatus and a control method thereof, such that the user interface becomes more user-friendly and makes the controlled device more controllable and the Internet of Things (IoT) more applicable. Accordingly, the present invention is patentable.

The above-mentioned descriptions represent merely the exemplary embodiment of the present invention, without any intention to limit the scope of the present invention thereto. Various equivalent changes, alterations or modifications based on the claims of present invention are all consequently viewed as being embraced by the scope of the present invention.

What is claimed is:

1. A motion recognition apparatus, comprising:
a first device comprising:
a multi-source data analysis and motion recognition sensor configured to sense a gesture variation of a user;
a Bluetooth communication module coupled to said multi-source data analysis and motion recognition sensor for wireless communication; and
a Wi-Fi communication module coupled to said multi-source data analysis and motion recognition sensor for wireless communication;
a second device comprising:
a Bluetooth/Wi-Fi communication input interface, as a signal input interface of said second device, configured to receive a wireless communication signal;
a sensor configured to sense said first device;
a central processing unit coupled to said Bluetooth/Wi-Fi communication input interface and said sensor and configured to operate and process in said second device;
a memory coupled to said central processing unit and configured to store a plurality of values;
wherein said central processing unit is configured to conduct value recognition on said gesture variation of the user sensed by said first device and provide a simple recognized value,
and configured to establish wireless communication among various devices; and
a Bluetooth/Wi-Fi communication output interface coupled to said central processing unit and configured to wirelessly transmit a control signal corresponding to said simple recognized value; and
a controlled device comprising a Bluetooth/Wi-Fi communication module configured to receive said control signal corresponding to said simple recognized value to conduct corresponding remote control and operations;
wherein said central processing unit provides said control signal corresponding to said simple recognized value after said central processing unit provides said simple recognized value;
wherein a fast communication step is performed after the gesture variation of the user is recognized and identified by the multi-source data analysis and motion recognition sensor as well as the wireless communication is established between said second device and said controlled device for the first time; wherein the wireless communication has been established between said second device and said controlled device, and the wireless communication is automatically established once the power is turned on;
wherein the second device communicates with the first device fast and also communicates with the controlled device according to the fast communication step, such that the first device remotely controls the controlled device through the definition and setting by the second device;

wherein said fast communication step comprising:
using said controlled device to provide and encrypt a first sequence of values;
using said second device to provide and encrypt a second sequence of values;
using a cloud to read and encrypt a third sequence of values; and
starting communication if said first sequence of values, said second sequence of values and said third sequence of values are identical;
wherein the gesture variation of the user is performed by one or more finger(s), and gesture variations includes waving and rotating.

2. The motion recognition apparatus of claim 1, further comprising a cloud server communicating wirelessly with said second device and said controlled device to conduct self-learning and memorizing of gesture variation recognition.

3. The motion recognition apparatus of claim 1, wherein said multi-source data analysis and motion recognition sensor is a gravity sensor, a gyroscope, a magnetometer or a mechanomyography.

4. A motion recognition apparatus, comprising:
a first device, comprising:
   a multi-source data analysis and motion recognition sensor configured to sense a gesture variation of a user;
   a controller coupled to said multi-source data analysis and motion recognition sensor and configured to operate and process in said first device;
   wherein said controller is configured to conduct value recognition on said gesture variation of the user and provide a simple recognized value;
   a Bluetooth communication module coupled to said multi-source data analysis and motion recognition sensor for wireless communication; and
   a Wi-Fi communication module coupled to said multi-source data analysis and motion recognition sensor for wireless communication;
a controlled device comprising a Bluetooth/Wi-Fi communication module configured to receive a control signal corresponding to said simple recognized value to conduct corresponding remote control and operations; and
a cloud server communicating wirelessly with said first device and said controlled device to conduct self-learning and memorizing of gesture variation recognition;
wherein said controller provides said control signal corresponding to said simple recognized value after said controller provides said simple recognized value;
wherein when said simple recognized value is identified to indicate that the gesture variation is complex, the cloud server provides back-end learning such that the complex gesture variation can be learned and stored;
wherein a fast communication step is performed after the gesture variation of the user is recognized and identified by the multi-source data analysis and motion recognition sensor as well as the wireless communication is established between said second device and said controlled device for the first time; wherein the wireless communication has been established between said second device and said controlled device, and the wireless communication is automatically established once the power is turned on;
wherein the second device communicates with the first device fast and also communicates with the controlled device according to the fast communication step, such that the first device remotely controls the controlled device through the definition and setting by the second device;
wherein said fast communication step comprising:
using said controlled device to provide and encrypt a first sequence of values;
using said second device to provide and encrypt a second sequence of values;
using a cloud to read and encrypt a third sequence of values; and
starting communication if said first sequence of values, said second sequence of values and said third sequence of values are identical;
wherein the gesture variation of the user is performed by one or more finger(s), and gesture variations includes waving and rotating.

5. The motion recognition apparatus of claim 4, wherein said multi-source data analysis and motion recognition sensor is a gravity sensor, a gyroscope, a magnetometer or a mechanomyography.

6. A motion recognition method applicable to a motion recognition apparatus including a first device, a second device, and a controlled device, said motion recognition method comprising:
selecting, by the motion recognition apparatus, a value from a plurality of values acquired by a multi-source data analysis and motion recognition sensor of said first device; encrypting said value by one of the first device, the second device and the controlled device; providing a series of permuted values by the motion recognition apparatus; providing, by the motion recognition apparatus, a simplified value corresponding to said permuted values; identifying, by the motion recognition apparatus, said simplified value to indicate that a gesture variation of a user is simple or complex; and completing an initial motion recognition step by the motion recognition apparatus;
wherein a fast communication step is performed after the gesture variation of the user is recognized and identified by the multi-source data analysis and motion recognition sensor as well as the wireless communication is established between said second device and said controlled device for the first time; wherein the wireless communication has been established between said second device and said controlled device, and the wireless communication is automatically established once the power is turned on; wherein the second device communicates with the first device fast and also communicates with the controlled device according to the fast communication step, such that the first device remotely controls the controlled device through the definition and setting by the second device, wherein said fast communication step comprising: using said controlled device to provide and encrypt a first sequence of values; using said second device to provide and encrypt a second sequence of values; using a cloud to read and encrypt a third sequence of values; and starting communication if said first sequence of values, said second sequence of values and said third sequence of values are identical; wherein the gesture variation of the user is performed by one or more finger(s), and gesture variations includes waving and rotating.

7. The motion recognition method of claim 6, wherein said value is encrypted by Rivest-Shamir-Adleman (RSA)

encryption, Laplace encryption, data encryption standard (DES) algorithm, advanced encryption standard (AES) algorithm or symmetric encryption.

8. The motion recognition method of claim 6, wherein said first sequence of values, said second sequence of values and said third sequence of values are encrypted by Rivest-Shamir-Adleman (RSA) encryption, Laplace encryption, data encryption standard (DES) algorithm, advanced encryption standard (AES) algorithm or symmetric encryption.

9. The motion recognition method of claim 6, wherein said cloud is implemented by a cloud server.

10. A motion recognition method applicable to a motion recognition apparatus including a first device, a second device, and a controlled device, said motion recognition method comprising:
   selecting a value from a plurality of values acquired by a multi-source data analysis and motion recognition sensor of said first device;
   encrypting said value; and
   completing an initial motion recognition step;
   wherein a fast communication step is performed after the gesture variation of the user is recognized and identified by the multi-source data analysis and motion recognition sensor as well as the wireless communication is established between said second device and said controlled device for the first time; wherein the wireless communication has been established between said second device and said controlled device, and the wireless communication is automatically established once the power is turned on;
   wherein the second device communicates with the first device fast and also communicates with the controlled device according to the fast communication step, such that the first device remotely controls the controlled device through the definition and setting by the second device;
   wherein said fast communication step comprising:
   using said controlled device to provide and encrypt a first sequence of values;
   using said second device to provide and encrypt a second sequence of values;
   using a cloud to read and encrypt a third sequence of values; and
   starting communication if said first sequence of values, said second sequence of values and said third sequence of values are identical;
   wherein the gesture variation of the user is performed by one or more finger(s), and gesture variations includes waving and rotating.

11. The motion recognition method of claim 10, wherein said value is encrypted by Rivest-Shamir-Adleman (RSA) encryption, Laplace encryption, data encryption standard (DES) algorithm, advanced encryption standard (AES) algorithm or symmetric encryption.

12. The motion recognition method of claim 10, wherein said first sequence of values, said second sequence of values and said third sequence of values are encrypted by Rivest-Shamir-Adleman (RSA) encryption, Laplace encryption, data encryption standard (DES) algorithm, advanced encryption standard (AES) algorithm or symmetric encryption.

13. The motion recognition method of claim 10, wherein said cloud is implemented by a cloud server.

* * * * *